(12) United States Patent
Nakamura

(10) Patent No.: US 7,042,894 B2
(45) Date of Patent: May 9, 2006

(54) CONTROLLING APPARATUS, RECORD MEDIUM, AND METHOD FOR EXCHANGING AN INFORMATION SIGNAL AMONG ELECTRONIC DEVICES

(75) Inventor: Ikuo Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 1079 days.

(21) Appl. No.: 09/780,281

(22) Filed: Feb. 9, 2001

(65) Prior Publication Data

US 2002/0031136 A1    Mar. 14, 2002

(30) Foreign Application Priority Data

Feb. 9, 2000    (JP) .......................... P2000-038098

(51) Int. Cl.
   *H04L 12/28*    (2006.01)
(52) U.S. Cl. ....................................... 370/426; 370/503
(58) Field of Classification Search ..................... None
   See application file for complete search history.

(56) References Cited

U.S. PATENT DOCUMENTS

| 4,855,730 | A |   | 8/1989 | Venners et al. |  |
|---|---|---|---|---|---|
| 5,420,801 | A | * | 5/1995 | Dockter et al. ............. | 345/501 |
| 5,530,859 | A | * | 6/1996 | Tobias et al. ............... | 713/400 |
| 5,600,711 | A |   | 2/1997 | Yuen |  |
| 5,712,834 | A |   | 1/1998 | Nagano et al. |  |
| 5,870,441 | A | * | 2/1999 | Cotton et al. ............... | 375/354 |
| 6,199,136 | B1 | * | 3/2001 | Shteyn ....................... | 710/305 |

FOREIGN PATENT DOCUMENTS

| EP |   | 0913997 A2 | 5/1999 |
| EP |   | 0 957636 A2 | 11/1999 |
| WO | WO 99/57837 |   | 11/1999 |

\* cited by examiner

*Primary Examiner*—Huy D. Vu
*Assistant Examiner*—Daniel Ryman
(74) *Attorney, Agent, or Firm*—Bell, Boyd & Lloyd LLC

(57) ABSTRACT

A controlling apparatus, record medium, and method, which include the steps of (a) obtaining control information from the electronic devices, the control information allowing the electronic devices to be controlled, (b) determining whether or not the electronic devices have a lime setting function corresponding to the control information obtained at the step (a), (c) obtaining time information, and (d) setting each of the electronic devices determined as devices having the time setting function at the step (b) to the time information obtained at the step (c). Thus, even if an electronic device connected to a network system does not have a function for obtaining time information through the network system, time corresponding to time information can be set for the electronic device.

9 Claims, 9 Drawing Sheets

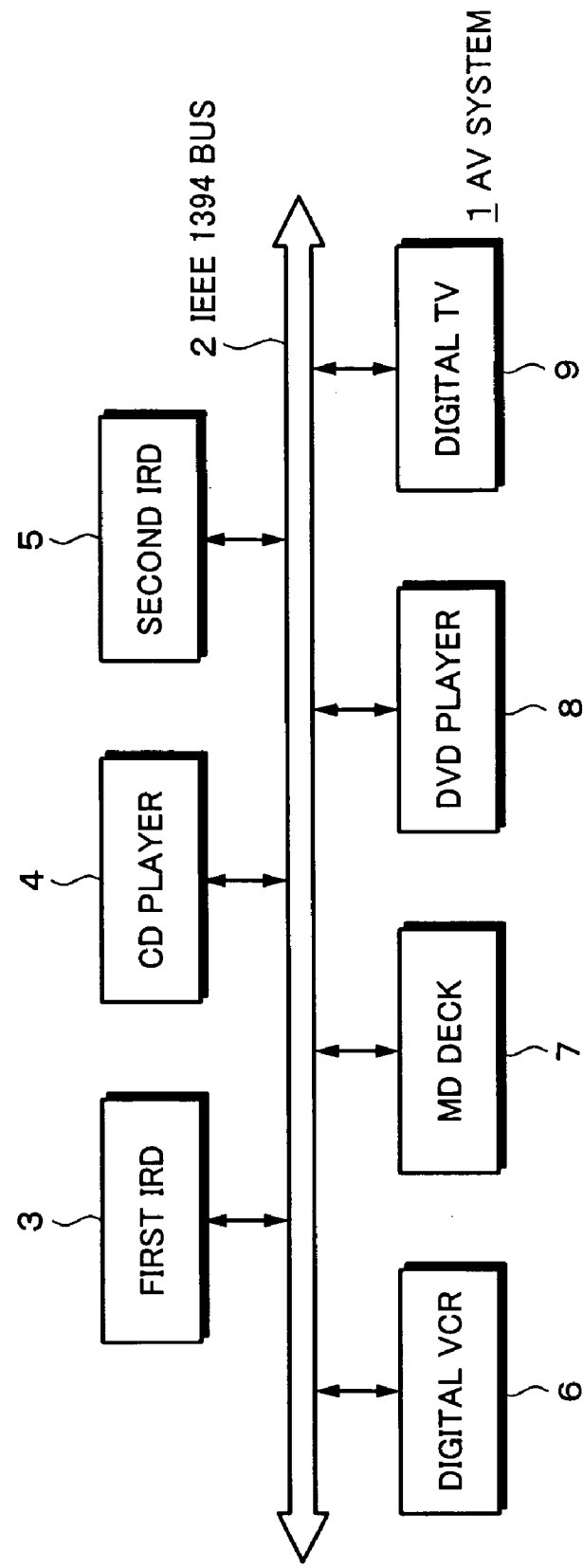

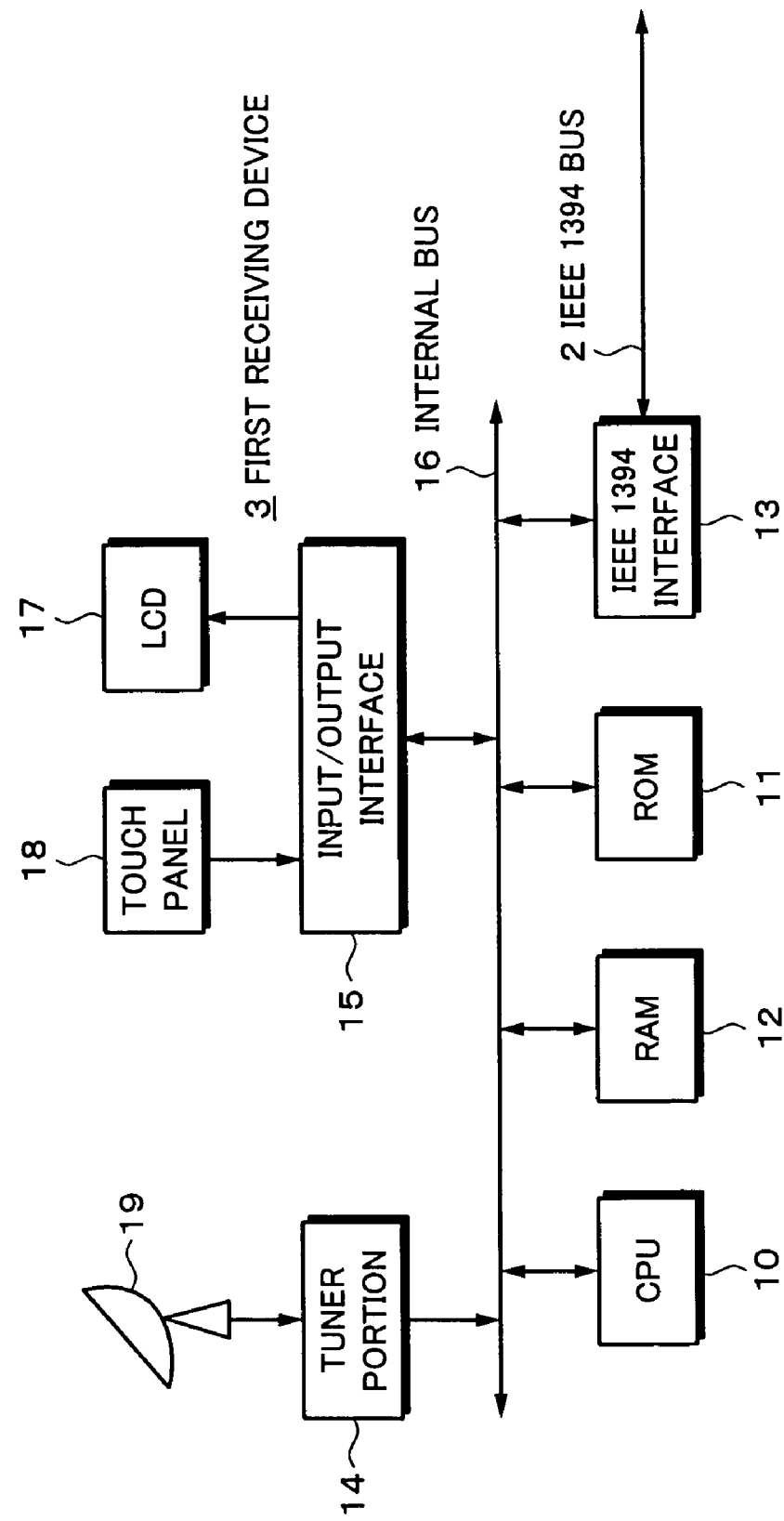

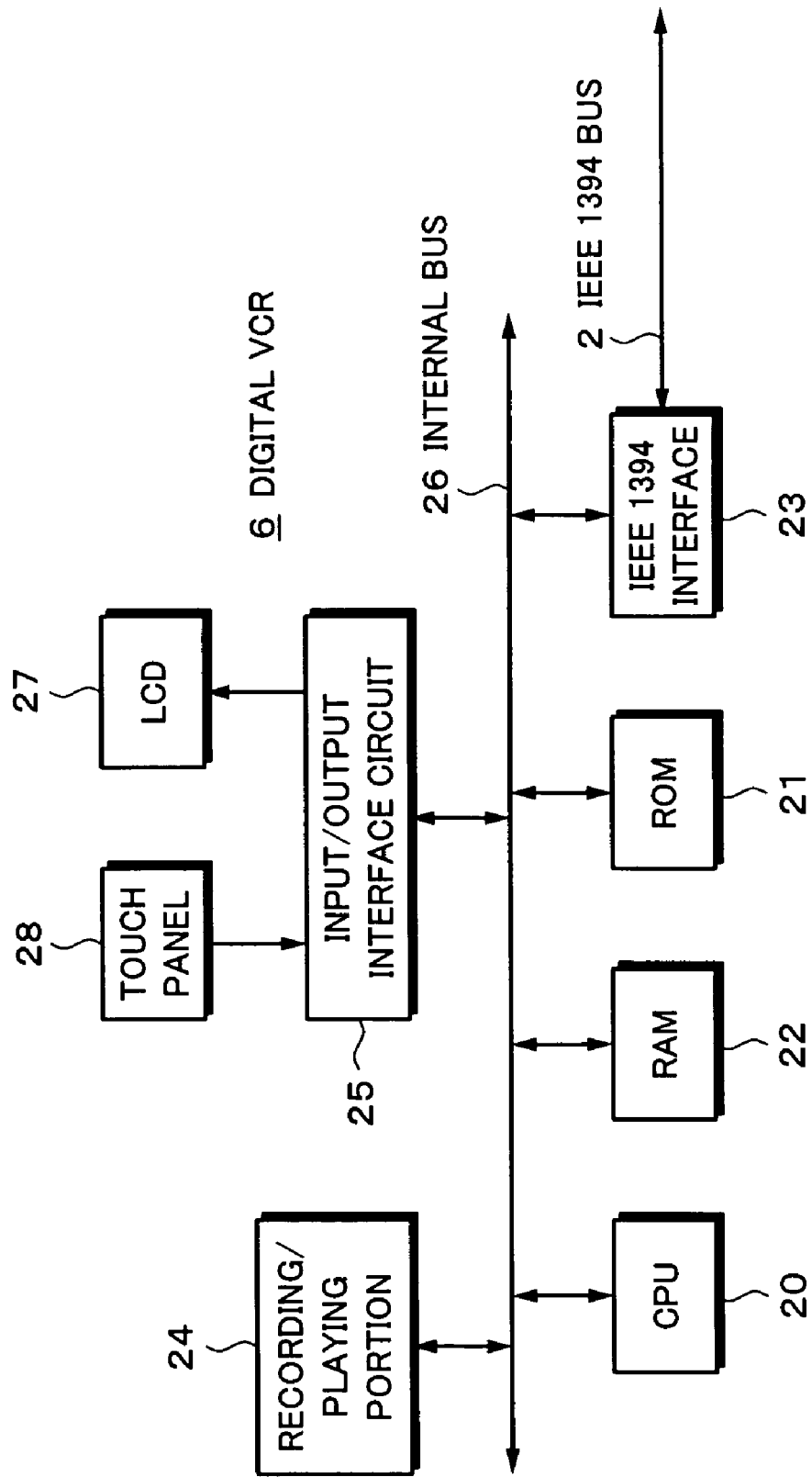

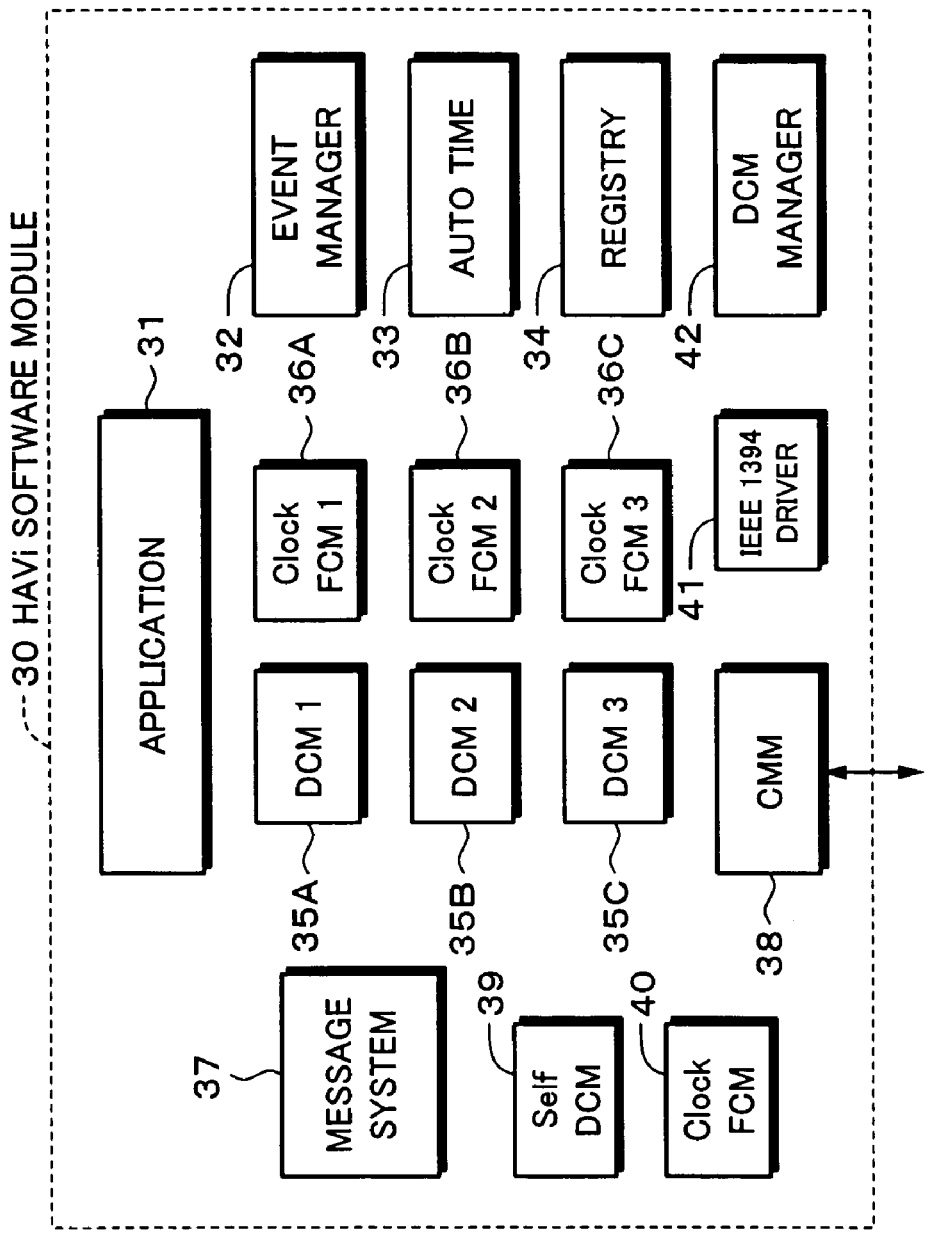

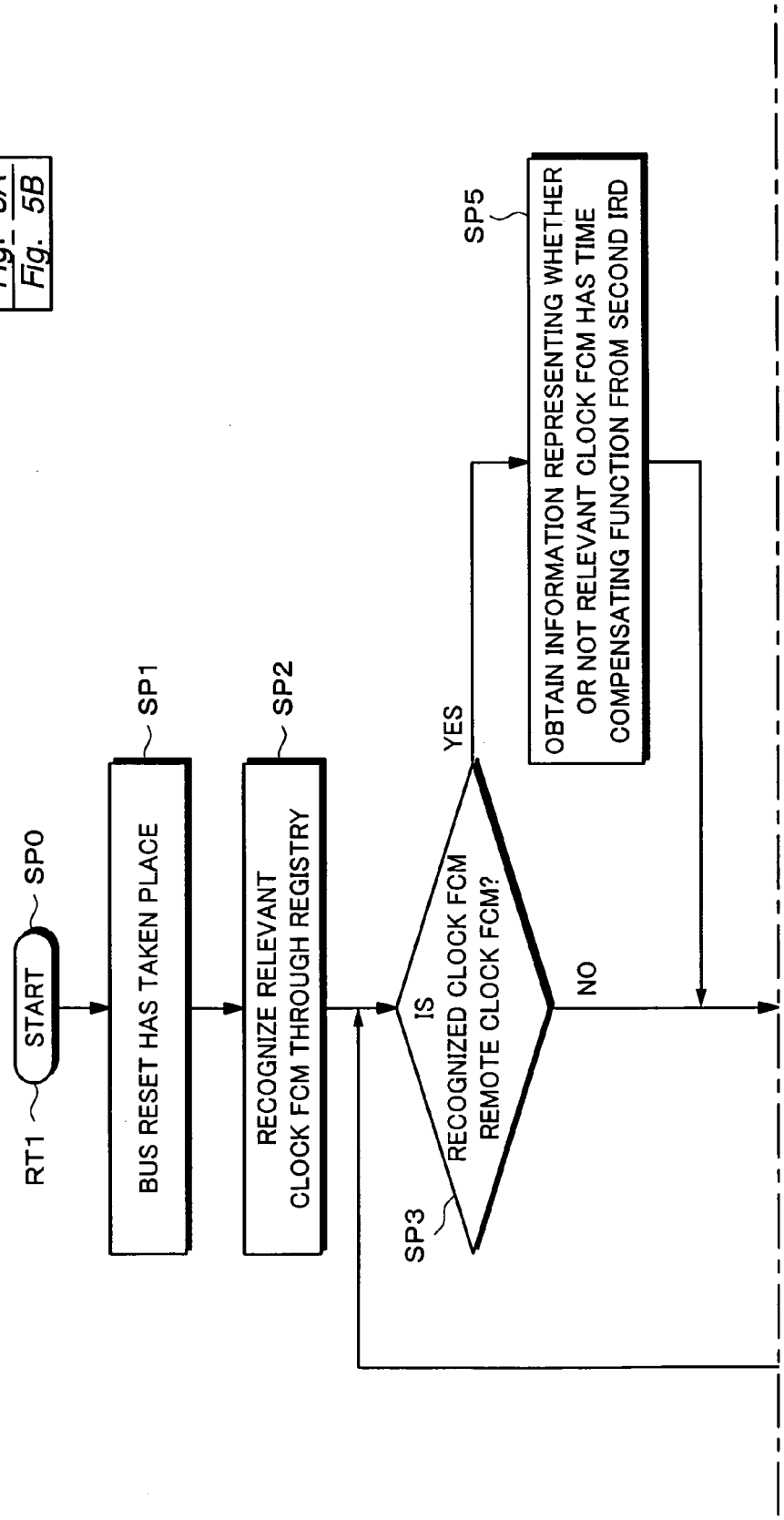

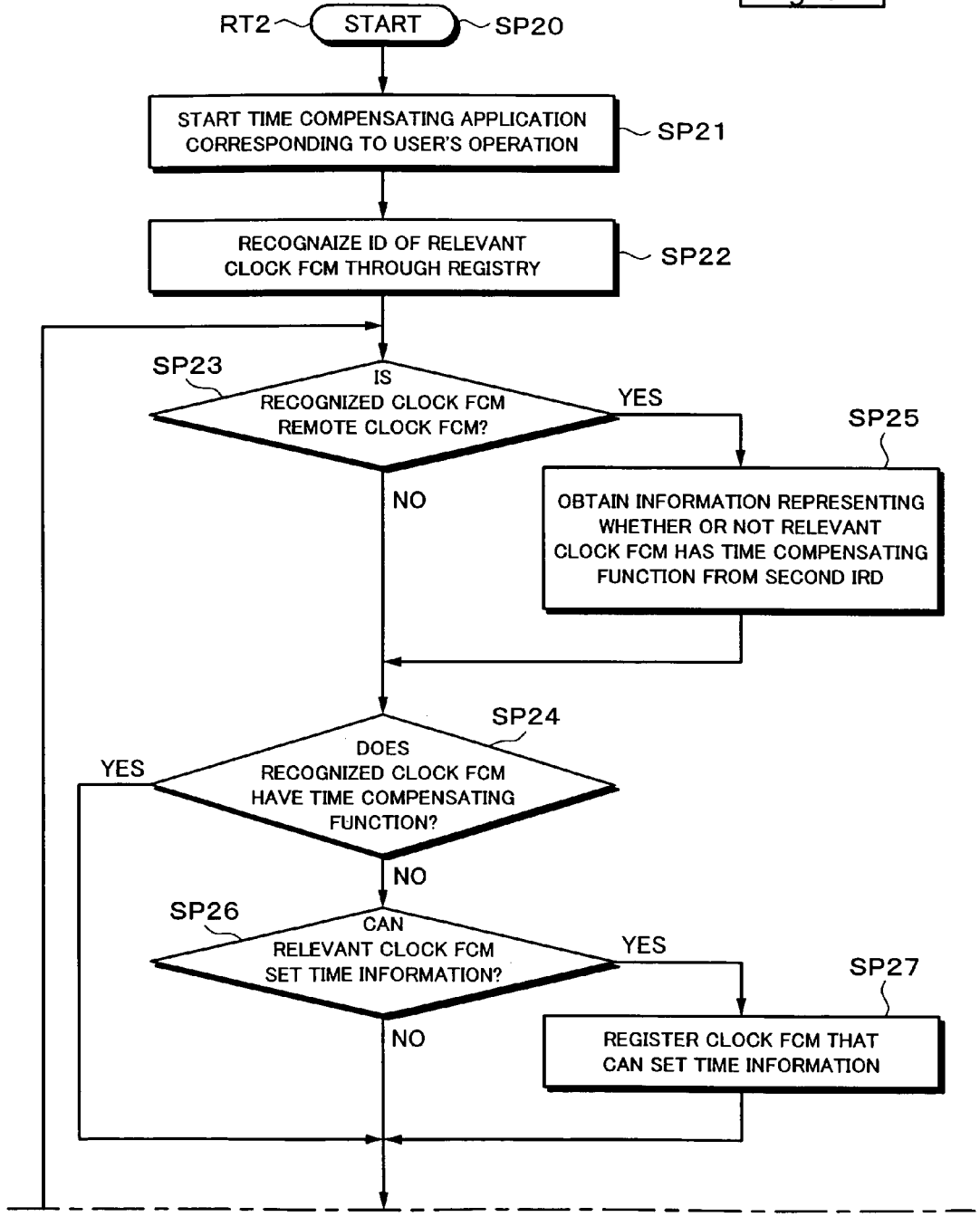

CONTROLLING APPARATUS, RECORD MEDIUM, AND METHOD FOR EXCHANGING AN INFORMATION SIGNAL AMONG ELECTRONIC DEVICES

BACKGROUND OF THE INVENTION

1. Field of the Invention

The present invention relates to a controlling apparatus, a record medium and a method, in particular, to those suitable for a home network system of which a number of digital AV (Audio Visual) devices are connected through, for example, the IEEE (Institute of Electrical and Electronics Engineers) 1394 bus.

2. Description of the Related Art

In recent years, mutual connection specifications have been proposed as middle wear of a home network system named HAVi (Home Audio/Video interoperability Architecture). Such specifications are for integrally managing and controlling a plurality of digital AV devices.

In such a home network system, when a digital AV device on the controlling side (referred to as controlling device) of a number of AV devices uploads control software stored in a digital AV device on the controlled side (referred to as controlled device) through the IEEE 1394 bus, even if a number of digital AV devices manufactured by different manufacturers are connected, they are normally and mutually operated. However, such high end digital AV devices are equipped with respective internal clocks. Corresponding to time information obtained from the outside (for example, a digital satellite broadcast), time of their clocks is compensated. Hereinafter, such a function is referred to as time compensating function.

On the other hand, low end digital AV devices may not be equipped with such a time compensating function due to the restriction of the cost. When video data is dubbed between digital VCR devices connected through, for example, the IEEE 1394 bus, if time of their internal clocks deviates, the recorded picture deviates from the reproduced picture. Thus, before the video data is dubbed, time of their internal clocks should be compensated so that the recorded picture synchronizes with the reproduced picture.

Thus, it is preferred to uniformly manage time of the internal clocks of the individual digital AV devices of a home network system.

SUMMARY OF THE INVENTION

The present invention, therefore, is directed to a controlling apparatus, a record medium and a method that allow time of internal clocks of individual electronic devices on a network to be uniformly managed.

A first aspect of the present invention is a controlling apparatus for exchanging an information signal among a number of electronic devices through a network system, wherein the apparatus includes a control information obtaining part for obtaining control information from the electronic devices, the control information allowing the electronic devices to be controlled, a time setting function determining part for determining whether or not the electronic devices have a time setting function corresponding to the control information obtained by the control information obtaining part, a time information obtaining part for obtaining time information, and a time information setting part for setting the time information obtained by the time information obtaining part to each of the electronic devices determined as devices having the time setting function by the time setting function determining part.

As a result, according to the controlling apparatus, even if an electronic device connected to a network system does not have a function for obtaining time information through the network system, time corresponding to time information can be set for the electronic device.

A second aspect of the present invention is a controlling method for exchanging an information signal among a number of electronic devices through a network system, wherein the method includes the steps of (a) obtaining control information from the electronic devices, the control information allowing the electronic devices to be controlled, (b) determining whether or not the electronic devices have a time setting function corresponding to the control information obtained at step (a), (c) obtaining time information, and (d) setting the time information obtained at step (c) to each of the electronic devices determined as devices having the time setting function at step (b).

As a result, according to the controlling method, even if an electronic device connected to a network system does not have a function for obtaining time information through the network system, time corresponding to time information can be set to the electronic device.

A third aspect of the present invention is a record medium for storing a program that executes the steps of (a) obtaining control information from the electronic devices, the control information allowing the electronic devices to be controlled, (b) determining whether or not the electronic devices have a time setting function corresponding to the control information obtained at step (a), (c) obtaining time information, and (d) setting the time information obtained at step (c) to each of the electronic devices determined as devices having the time setting function at step (b).

As a result, when the program stored in the record medium is executed, even if an electronic device connected to a network system does not have a function for obtaining time information through the network system, time corresponding to time information can be set to the electronic device.

Additional features and advantages of the present invention are described in, and will be apparent from, the following Detailed Description of the Preferred Embodiments and the Drawings.

DESCRIPTION OF THE DRAWINGS

FIG. 1 is a block diagram showing the structure of an AV system according to an embodiment of the present invention;

FIG. 2 is a block diagram showing the internal structure of a first receiving device shown in FIG. 1;

FIG. 3 is a block diagram showing the internal structure of a digital VCR shown in FIG. 1;

FIG. 4 is a schematic diagram for explaining a HAVi software module;

DETAILED DESCRIPTION OF THE PREFERRED EMBODIMENTS

Figure 5B:
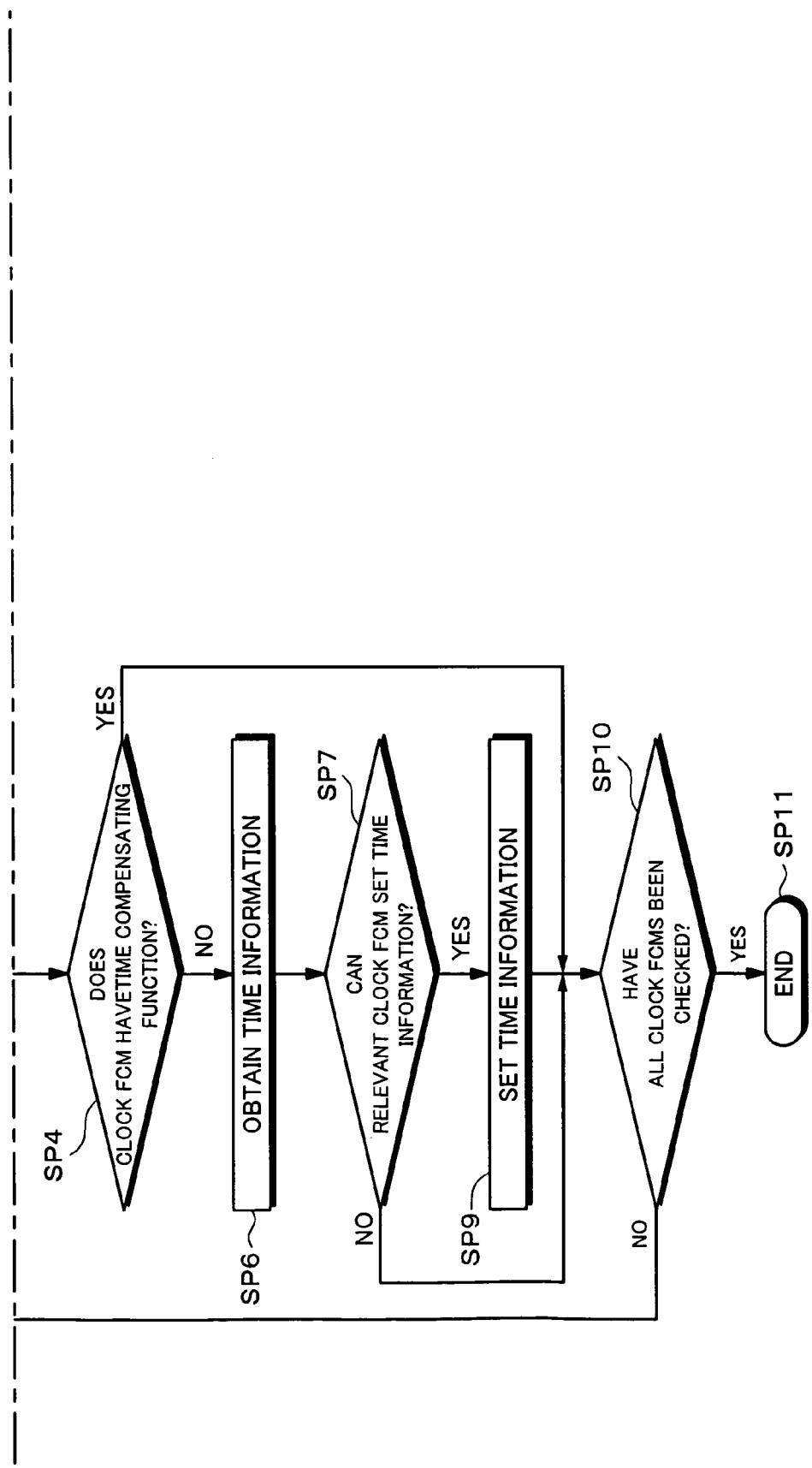
FIG. 5 is a flow chart for explaining a time setting process.

With reference to the accompanying drawings, an embodiment of the present invention will be described.

(1) The Structure of an AV System According to the Present Invention

FIG. 1 is a block diagram showing the overall structure of an AV system according to the teachings of the present invention. In FIG. 1, reference numeral 1 is the AV system. In the AV system 1, a number of AV devices that are a first receiving device (IRD: Integrated Receiver and Decoder) 3, a CD (Compact Disc) player 4, a second receiving device (IRD) 5, a digital VCR 6, an MD (Mini Disc) deck 7, a DVD (Digital Versatile Disc) player 8, and a digital TV 9 are mutually connected through an IEEE 1394 bus 2.

When the devices on the network shown in FIG. 1 are cooperatively operated, dedicated software that controls and manages the network is required between low level software (such as an operating system (OS), a network controlling program, or a database system) and high level application software. Such dedicated software is referred to as middleware. The middleware provides various services to an application. To allow a network of devices of different manufacturers to normally and cooperatively operate, common specifications for the middleware are essential. Next, a network system using HAVi (Home Audio/Video interoperability Architecture) (trademark) as middleware that controls and manages a network will be described.

In the AV system 1, the first receiving device 3 as a controlling device of the number of digital AV devices controls the digital VCR 6, the MD deck 7, and the DVD player 8 as locally controlled devices. When necessary, by executing HAVi software (that will be described later), the first receiving device 3 can control the CD player 4 and the digital TV 9 as remotely controlled devices.

In the AV system 1, the second receiving device 5 as a controlling device controls the CD player 4 and the digital TV 9 as locally controlled devices. When necessary, by executing the HAVi software, the second receiving device 5 can control the digital VCR 6, the MD deck 7, and the DVD player 8 as remotely controlled devices.

In the example, as shown in FIG. 2, in the first receiving device 3, a CPU (Central Processing Unit) 10, a ROM (Read Only Memory) 11, a RAM (Random Access Memory) 12, an IEEE 1394 interface circuit 13, a tuner portion 14, and an input/output interface circuit 15 are mutually connected through an internal bus 16. The ROM 11 stores various types of programs. The RAM 12 operates as a work memory of the CPU 10. In addition, an LCD (Liquid Crystal Display) 17 and a touch panel 18 are connected to the input/output interface circuit 15.

The CPU 10 sends video data corresponding to a program stored in the ROM 11 to the LCD 17 through the internal bus 16 and the input/output interface circuit 15 in succession. As a result, the LCD 17 displays required information.

In addition, when necessary, the CPU 10 controls the tuner portion 14 and the IEEE 1394 interface circuit 13 corresponding to various instructions that are input through the touch panel 18 and corresponding to commands supplied from the AV devices 4 to 9 (see FIG. 1) through the IEEE 1394 bus 2. As a result, when a particular channel reception instruction or command of, for example, a digital satellite broadcast is supplied to the first receiving device 3 through the touch panel 18, the tuner portion 14 selects the relevant channel and supplies the obtained video and/or audio signal to the relevant digital AV devices 4 to 9 through the internal bus 16, the IEEE 1394 interface circuit 13, and the IEEE 1394 bus 2. The first receiving device 3 and the second receiving device 5 periodically obtain time information superimposed with the digital satellite broadcast through an antenna 19 and the tuner portion 14 and compensate time of the clocks of the first receiving device 3 and the second receiving device 5.

On the other hand, as shown in FIG. 3, in the digital VCR 6 as a controlled device, a CPU 20, a ROM 21, a RAM 22, an IEEE 1394 interface circuit 23, a recording/playing portion 24, and an input/output interface circuit 25 are mutually connected through an internal bus 26. In addition, an LCD 27 and a touch panel 28 are connected to the input/output interface circuit 25. In this case, the CPU 20 supplies video data corresponding to a program stored in the ROM 21 to the LCD 27 through the internal bus 26 and the input/output interface circuit 25 in succession. The LCD 27 displays required information.

In addition, when necessary, the CPU 20 controls the recording/playing portion 24 corresponding to various instructions that are input through the touch panel 28 and corresponding to commands supplied from the first receiving device 3 or the second receiving device 5 (see FIG. 1) through the IEEE 1394 bus. As a result, when a record instruction is supplied to the digital VCR 6, video/audio signals that are received from the digital AV devices 3, 5, 8, and 9 through the IEEE 1394 bus 2 are supplied to the recording/playing portion 24 through the IEEE 1394 interface circuit 23 and the internal bus 26. The recording/playing portion 24 records the video/audio signals to a magnetic tape (not shown). When a reproduction instruction is supplied to the digital VCR 6, the recording/playing portion 24 reproduces video/audio signals recorded on the magnetic tape (not shown) and supplies the reproduced video/audio signals to the digital TV 9 through the internal bus 26 and the IEEE 1394 bus 2.

In the AV system 1, data is sent and received among the number of digital AV devices 3 to 9 mutually connected through the IEEE 1394 bus 2. In addition, the controlling devices (the first receiving device 3 and the second receiving device 5) supply various control instructions to controlled devices (the CD player 4, the digital VCR 6, the MD deck 7, the DVD player 8, and the digital TV 9) so as to control them.

(2) The Software Structure of the first Receiving Device.

In reality, software of the first receiving device 3 as a controlling device is composed of an HAVi software module 30 shown in FIG. 4. The HAVi software module 30 is composed of an application 31, an event manager 32, an auto time 33, a registry 34, a number of device control modules (DCMs) 35A to 35C, a number of clock functional component modules (clock FCMs) 36A to 36C, a message system 37, a communication media manager (CMM) 38, a self device control module (self DCM) 39, a clock functional component module (clock FCM) 40, an IEEE 1394 driver 41, and a DCM manager 42. The clock functional component modules (clock FCMs) 36A to 36C correspond to the device control modules (DCMs) 35A to 35C, respectively. The clock functional component module (clock FCM) 40 corresponds to the self device control module (self DCM) 39.

Each device connected to the network has such a software module corresponding to the device class defined in HAVi. In HAVi, the following four types of device classes are defined.

The first type is a full AV device (FAV) that has a function for managing the network. The full AV device (FAV) has all the elements of the HAVi software module 30. Sometimes, the full AV device (FAV) may not have device control modules (DCMs) and functional component modules (FCMs). However, these elements may be installed by a base AV device (BAV) (to be described later).

The full AV device (FAV) can execute a Java (trademark) application used as HAVi byte code. Thus, the full AV device (FAV) can have another device control module (DCM) and a functional control module (FCM) of another device. When the full AV device (FAV) has these modules of another device, the full AV device (FAV) can control the device.

The second type is an intermediate AV device (IAV) that has a function for controlling the network as with a full AV device (FAV). However, unlike with an full AV device (FAV), the intermediate AV device (IAV) cannot execute a Java (trademark) application used as HAVi binary code. Thus, to control another device, the intermediate AV device (IAV) should have a device control module (DCM) and a functional component module (FCM) of the device.

The third type is a base AV device (BAV) that corresponds to a controlled device that can be directly connected to the network of HAVi. The base AV device (BAV) has a device control module (DCM) and a functional component module (FCM) of the local device.

The fourth type is a legacy AV device (LAV) that has only a function as a device that can be connected to the IEEE 1394 serial bus 2. To deal with AV/C commands, the legacy AV device (LAV) can operate independently or as a controlled device.

In the following description, it is assumed that the first receiving device (IRD) 3 and the second receiving device (IRD) 5 are full AV devices (FAVs) and that the CD player 4, the digital VCR 6, the MD deck 7, the DVD player 8, and the digital TV 9 are base AV devices (BAVs).

FIG. 4 shows an example of software stored in the ROM 11 shown in FIG. 2. The elements excluding the IEEE 1394 driver 41 and the application 31 compose the HAVi software module. The IEEE 1394 driver 41 is an element containing a description about the IEEE 1394 bus 2. The IEEE 1394 driver 41 provides a sharing procedure for device-accessing high level software.

The application 31 is software for executing various processes. However, in the example, the application 31 converts a control command (function) that is input through a graphical user interface (GUI) that controls the device into an executable command for the auto time 33 and the functional component modules (clock FCMs) 36A to 36C (to be described later).

When the device control modules (DCMs) 35A to 35C are uploaded from a locally controlled device to the HAVi software module 30 through the IEEE 1394 bus 2, the application 31 queries the registry 34 for attribute information of the controlled device. The registry 34 is a directory service of the HAVi software. The registry 34 can recognize all software elements of the home network. The registry 34 stores attribute information as a list of local digital AV devices on the home network.

The event manager 32 is a software element that manages an event that takes place on the home network (an even represents that the network varies because a new device is connected or disconnected on the network). When a predetermined event takes place, the event manager 32 notifies a predetermined software element of an occurrence of the event.

The device control module (DCM) manager 42 installs a device control module (DCM) and a functional component module (FCM) corresponding to each device on the network. In an HAVi network, when a new device is connected to the network, the device control module (DCM) manager 42 installs a device control module (DCM) and a functional component module (FCM) corresponding to the newly connected device. In contrast, when a device is disconnected from the network, the device control module (DCM) manager 42 uninstalls a device control module (DCM) and a functional component module (FCM) corresponding to the disconnected device.

The device control module (DCM) controls each device. The application 31 does not directly control each device connected to the network, but through the device control module (DCM). The application 31 represents a control command (function) for each device. The functional component module (FCM) transmits an AV/C (Audio & Video/ Control) command to a device designated by the device control module (DCM).

Since a device control module (DCM) and a functional component module (FCM) operate as an application program interface (API), the application 31 does not need to consider the differences of individual devices. Thus, on the HAVi network, a device on the network can recognize the function of another device. In other words, a device on the HAVi network can control another device on the network.

The auto time 33 is a software element that has a time information setting function corresponding to an AV/C (audio & Video/Control) command for the device control modules (DCMs) 35A to 35C (hereinafter, this function is referred to as set clock function) and a time information obtaining function for obtaining time information from the outside (in the embodiment, for example, a digital satellite broadcast). The auto time 33 has commands of an application program interfaces (APIs) that are "Get Clock FCMs", "Has Auto Clock", "Get Clock", "Set Allowable Clock", and "Set Clock". The "Get Clock FCMs" obtains a clock functional component module (FCM) list corresponding to all the digital AV devices 3 to 9 connected to the network from the registry 34. The "Has Auto Clock" obtains information representing whether or not the clock functional component module (FCM) has a time compensating function for compensating time of the clock of the local device with time information received from the outside corresponding to an input ID of the clock functional component module (FCM). The "Get Clock" obtains time information of for example date, hour, and second from a clock functional component module (FCM) having the time compensating function corresponding to an input ID thereof. The "Set Allowable Clock" obtains information representing whether or not a clock functional component module (FCM) permits an external time information setting operation. The "Set Clock" sets time to a clock functional component module (FCM).

The auto time 33 sends the "Get clock FCMs" to the registry 34 and obtains software element IDs (SEIDs) of all clock functional component modules (Clock FCMs) connected to the same network. Thereafter, the auto time 33 sends the "Has Auto Clock" to all the clock functional component modules (Clock FCMs) corresponding to the obtained clock FCM IDs and obtains software element IDs (SEIDs) of -the clock functional component modules (clock FCMs) having the time compensating function.

As a result, the auto time 33 sends the "Set Allowable Clock" for obtaining information representing whether or not each clock functional component module (Clock FCM) that does not have the time compensating function requires accurate time compensation information. On the other hand, the auto time 33 sends the "Get Clock Accuracy" to each clock functional component module (Clock FCM) having the time compensating function. Consequently, the auto time 33 obtains the time accuracy of each clock functional component module (Clock FCM).

When the auto time 33 has obtained a number of clock functional component modules (Clock FCMs) having the time compensating function, corresponding to a predetermined procedure, the auto time 33 designates a clock functional component module (FCM) having the highest time accuracy as a reference clock. Alternatively, the auto time 33 may designate a clock functional component module (Clock FCM) having an auto time function as a standard clock functional component module (Clock FCM).

Thereafter, the auto time 33 sends the "Get Clock" to the clock functional component module (FCM) having the highest time accuracy on the network and obtains time information therefrom. Thereafter, the auto time 33 sends and sets the obtained time information of for example date, hour, and minute to a clock functional component module (Clock FCM) corresponding to each device that requires the time information.

According to the described embodiment of the present, the first receiving device 3 containing a clock functional component module (Clock FCM) having the time compensating function and the auto time 33 is treated as a standard clock of time information. However, when the second receiving device 5 contains a clock functional component module (Clock FCM) having the time compensating function regardless of the presence of the auto time 33, the clock functional component module (Clock FCM) of the second receiving device 5 can be treated as a clock functional component module (Clock FCM) for standard time information.

The communication media manager (CMM) 38 operates as an interface between the IEEE 1394 bus 2 and each software element and application of the HAVi software module 30. The communication media manager (CMM) 38 provides a transmission mechanism that sends and receives signals among the individual devices connected through the IEEE 1394 bus 2. In addition, the communication media manager (CMM) 38 detects the operation state of the IEEE 1394 bus 2 and supplies information of the detected state to other software modules.

The message system 37 operates as an application program interface (API) that allows the software modules of individual devices on the network to communicate each other. In other words, the message system 37 has a role for transmitting a message between software modules. Thus, in a network using HAVi software, a message can be transmitted between the message transmitting side and the message receiving side without need to know their network locations.

The self device control module (Self DCM) 39 is a device control module of the first receiving device 3. In addition, the clock functional component module (Clock FCM) 40 that corresponds to the self device control module (Self DCM) 39 is a functional component module of the first receiving device 3.

(3) First Embodiment (3-1) Time Setting Process.

In reality, when the CD player 4 is connected to the AV system 1 through the IEEE 1394 bus 2 by the user as shown in FIG. 1 (namely, a bus reset takes place due to a topology change on the network), the CPU 10 of the first receiving device 3 determines that the time setting application has started. At that point, time setting process RT1 starts at step SP0 shown in FIG. 5.

Thereafter, the flow advances to step SP1. At step SP1, the CPU 10 recognizes an event of a bus reset on the IEEE 1394 bus 2 (namely, the network layer has been reinitialized). In other words, at step SP1, when a controlled device (4 and 6 to 9) and a controlling device (5) are connected to the IEEE 1394 bus 2, the event manager 32 is notified of an event that represents that a bus reset has taken place on the IEEE 1394 bus 2 through the communication media manager (CMM) 38 of the HAVi software module 30. The event manager 32 notifies the application 31, the auto time 33, and other software elements of the event representing that the bus has been reset.

Thereafter, the flow advances to step SP2. At step SP2, the auto time 33 of the HAVi software module 30 queries the registry 34 for the "Get Clock FCM" and obtains the ID of the clock functional component module (Clock FCM) of the controlled device (4 and 6 to 9) and the controlling device (5) connected to the IEEE 1394 bus 2. Thereafter, the flow advances to step SP3.

At step SP3, the CPU 10 determines whether or not the recognized clock functional component module (Clock FCM) is a clock functional component module (Clock FCM) of the second receiving device 5 rather than the first receiving device 3. When the determined result at step SP3 is "No", the flow advances to step SP4.

At step SP4, the CPU 10 determines whether or not the clock functional component module (Clock FCM) can compensate time of the clock with time information obtained from a digital satellite broadcast or through an external communicating system such as a network and a cable corresponding to the IDs of the clock functional component module (Clock FCM) obtained at step SP2. In other words, the auto time 33 of the HAVi software module 30 sends the "Has Auto Clock" to the clock functional component module (Clock FCM) connected to the IEEE 1394 bus 2 and queries the clock functional component module (Clock FCM) for the time compensating function. Corresponding to the responses of the clock functional component module (Clock FCM), the auto time 33 determines whether or not it has the time compensating function.

On the other hand, when the determined result at step SP3 is "Yes", it represents that the recognized clock functional component module (Clock FCM) is locally controlled by the second receiving device 5 rather than the first receiving device 3. At that point, the flow advances to step SP5. At step SP5, the CPU 10 obtains information representing whether or not the relevant controlled device (4 or 9) has the time compensating function from a CPU (not shown) of the second receiving device 5. Thereafter, the flow advances to step SP4.

When the determined result at step SP4 is "No", it represents that the clock functional component module (Clock FCM) obtained at step SP2 does not have the time compensating function. At that point, the flow advances to step SP6. At step SP6, the first receiving device 3 obtains time information supplied through, for example, a digital satellite broadcast. Thereafter, the flow advances to step SP7. To improve the time setting accuracy, step SP6 may be immediately followed by step SP9.

On the other hand, when the determined result at step SP4 is "Yes", it represents that the clock functional component module (Clock FCM) obtained at step SP2 has the time compensating function. At that point, the flow advances to step SP10.

At step SP7, the CPU 10 determines whether or not the clock functional component module (Clock FCM) that has been recognized at step SP2 and that does not have the time compensating function as the determined result at step SP4 has an external time information setting function and permits an external time information setting operation. In other words, the auto time 33 sends the "Set Allowance Clock" command to the clock functional component module (Clock FCM) and determines those corresponding to the return value.

When the determined result at step SP7 is "Yes", it represents that the clock functional component module (Clock FCM) has the external time setting function and permits the external time information setting operation. At that point, the flow advances to step SP9. At step SP9, the CPU 10 sends the "Set Clock" command to the clock functional component module (Clock FCM) that permits the external time information setting operation. Thus, the auto time 33 sets time information to a relevant device on the network corresponding to the clock functional component module (Clock FCM). Thereafter, the flow advances to step SP10.

At step SP10, the CPU 10 determines whether or not all the clock functional component modules (Clock FCMs) have been checked. When the determined result at step SP10 is "No", the flow returns to step SP3. At step SP3, the CPU 10 performs the above-described process for each of the clock functional component modules (Clock FCMs) that have not been checked.

When the determined result at step SP7 is "No", it represents that the clock functional component module (Clock FCM) does not have the external information setting function or does not permit external time information setting operation. At that point, the CPU 10 determines that the digital AV device corresponding to the clock functional component module (Clock FCM) does not permit the external time information setting operation. Thereafter, the flow advances to step SP10.

At step SP10, the CPU 10 determines whether or not the time setting process (at steps SP3 to SP9) has been performed for all digital AV devices that have the respective clock functional component modules (Clock FCMs) and that are connected to the IEEE 1394 bus 2. When the determined result at step SP10 is "Yes", the flow advances to step SP11. At that point, the CPU 10 completes the time setting process RT1.

On the other hand, when the determined result at step SP10 is "No", the CPU 10 determines that there is a digital AV device having a clock functional component module (Clock FCM) of which the time setting process (at steps SP3 to SP9) has not been performed. Thereafter, the flow returns to step SP3. At step SP3, the CPU 10 repeats the above-described process.

In such a manner, when a controlled device (4 and 6 to 9) and a controlling device (5) are newly connected to the IEEE 1394 bus 2, the CPU 10 of the first receiving device 3 recognizes a digital AV device that can set time information and supplies time information to the recognized digital AV device so that the time information is set to the digital AV device.

(3-2) Operation and Effect of First Embodiment.

In the above-described structure, when user's desired device (4 to 9) is newly connected to the IEEE 1394 bus 2 of the first receiving device 3 as a controlling device, the first receiving device 3 obtains the ID of a clock functional component module (Clock FCM) of the relevant device (4 to 9) connected to the IEEE 1394 bus 2. When the clock functional component module (Clock FCM) corresponding to the obtained ID is a device locally controlled by the second receiving device 5 rather than the first receiving device 3, information representing whether or not the device (4 to 9) has the time compensating function is obtained from the second receiving device 5.

Thereafter, the CPU 10 determines whether or not the relevant device has the time compensating function corresponding to the ID of the relevant clock functional component module (Clock FCM). When the determined result is "No" (namely, the relevant device does not have the time compensating function), the CPU 10 determines whether or not the relevant clock functional component module (Clock FCM) has the time information setting function and permits the external time information setting operation.

When the relevant device having the clock functional component module (Clock FCM) has the time information setting function and permits the external time information setting operation, the first receiving device 3 sends the "Set Clock" command as an AV/C command to the relevant device. Thus, even if the relevant device is not a device locally controlled by the first receiving device 3 or even if the relevant device does not have the time compensating function, the standard time of the first receiving device 3 can be set to the relevant device.

In the above-described structure, when a device (4 to 9) is newly connected to the AV system 1 through the IEEE 1394 bus 2, if the first receiving device 3 as a controlling device determines that the clock functional component module (Clock FCM) of the connected device (4 to 9) is locally controlled by the second receiving device 5 rather than the first receiving device 3, the first receiving device 3 obtains information representing whether or not the relevant device (4 to 9) has the time compensating function from the second receiving device 5.

When the clock functional component module (Clock FCM) of a device (4 to 9) connected to the first receiving device 3 has the time information setting function and permits the external time information setting operation, the first receiving device 3 sets time information obtained from a digital satellite broadcast or the like to the connected device. Thus, even if the connected device is not a local device of the first receiving device 3 or when the connected device does not have the time compensating function, a command can be substantially converted between the first receiving device 3 and the clock functional component module (Clock FCM) that can set time. Thus, accurate time information can be supplied to a device that requires accurate time information and that is connected on the network.

(4) Second Embodiment (4-1) Time Setting Process.

Figure 6B:
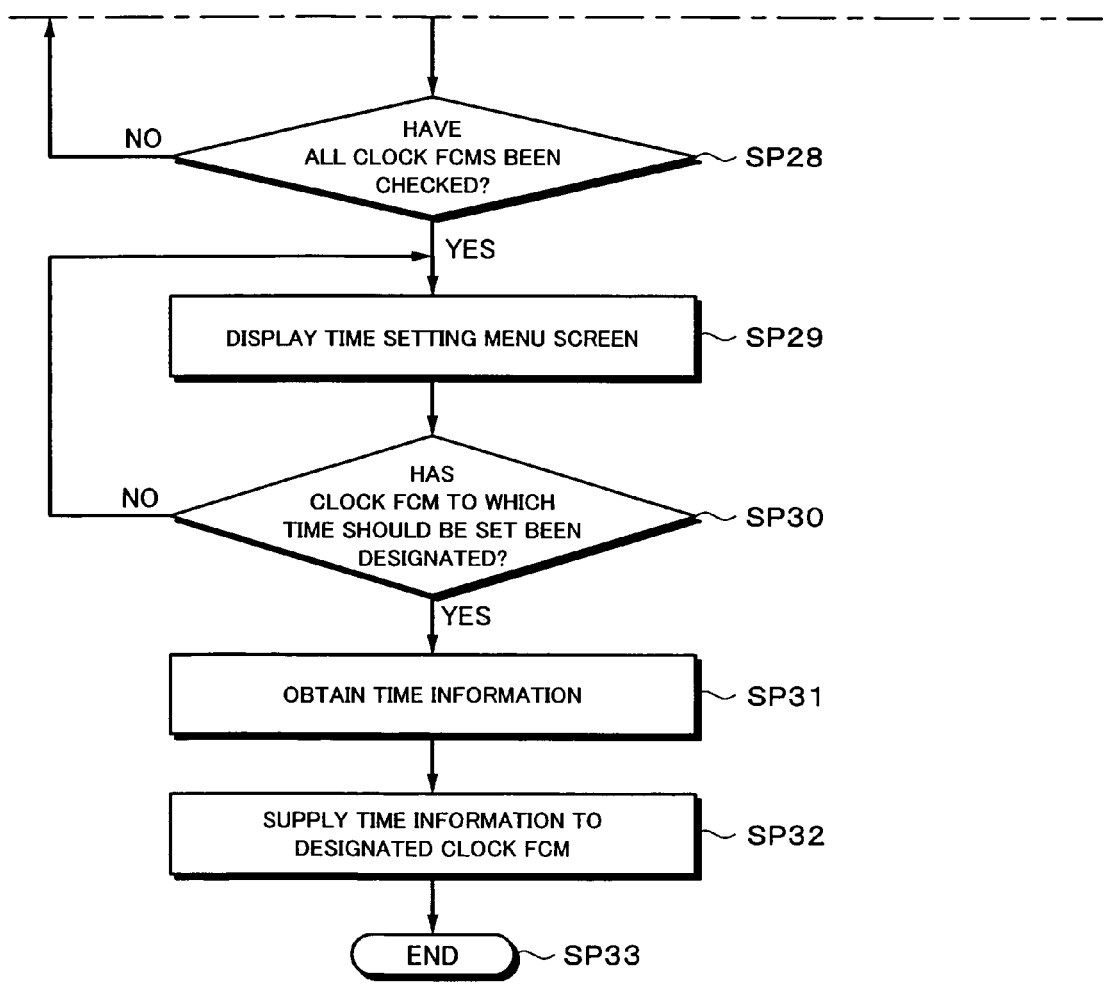
FIG. 6 is a flow chart for explaining a time setting process.

After the user turns on the power of the first receiving device 3, when the time setting application starts at any timing designated by the user, the time setting process starts at step SP20 shown in FIG. 6. Thereafter, the flow advances to step SP21. At step SP21, the CPU 10 recognizes an event that represents that the time setting application has started.

In other words, at step SP21, when the time setting application starts corresponding to user's operation, the event manager 32 is notified of an event representing that the time setting application has started through the communication media manager (CMM) 38 of the HAVi software module 30. The event manager 32 notifies the application 31, the auto time 33, and other software elements of the event.

Thereafter, the flow advances to step SP22. At step SP22, the auto time 33 of the HAVi software module 30 queries the registry 34 for the "Get Clock FCM". The CPU 10 obtains the ID of a clock functional component module (Clock FCM) of the controlled devices (4 and 6 to 9) and the controlling device (5) connected to the IEEE 1394 bus 2. Thereafter, the flow advances to step SP23.

At step SP23, the CPU 10 determines whether or not the recognized clock functional component module (Clock FCM) is controlled by the second receiving device 5 rather than the first receiving device 3. When the determined result at step SP23 is "No", the flow advances to step SP24.

At step SP24, the CPU 10 determines whether or not the relevant clock functional component module (Clock FCM) can compensate time with time information obtained from a digital satellite broadcast or through an external communicating system such as a network and a cable corresponding to the ID of the clock functional component module (Clock FCM) recognized at step SP22. In other words, the auto time 33 of the HAVi software module 30 sends the "Has Auto Clock" to the clock functional component module (Clock FCM) recognized at step SP22 and queries it for the time compensating function.

When the determined result at step SP23 is "Yes", it represents that the recognized clock functional component module (Clock FCM) is locally controlled by the second receiving device 5 rather than the first receiving device 3. At that point, the flow advances to step SP25. At step SP25, the CPU 10 obtains information representing whether or not the relevant device (4 or 9) has the time compensating function from the CPU (not shown) of the second receiving device 5. Thereafter, the flow advances to step SP24.

When the determined result at step SP24 is "Yes", it represents that the clock functional component module (Clock FCM) recognized at step SP22 has the time compensating function. At that point, the flow advances to step SP28.

On the other hand, when the determined result at step SP24 is "No", it represents that the clock functional component module (Clock FCM) recognized at step SP22 does not have the time compensating function. At that point, the flow advances to step SP26.

At step SP26, the CPU 10 determines whether or not the clock functional component module (Clock FCM) that has been recognized at step SP22 and that does not have the time compensating function as the determined result at step SP24 has the time information setting function and permits the external time information setting operation. In other words, the auto time 33 sends the "Set Allowable Clock" command to the relevant clock functional component module (Clock FCM). The CPU 10 determines those corresponding to the returned value of the clock functional component module (Clock FCM).

When the determined result at step SP26 is "Yes", it represents that the relevant clock functional component module (Clock FCM) has the external time setting function and permits the external time setting operation. At that point, the flow advances to step SP27. At step SP27, the CPU 10 registers the relevant clock functional component module (Clock FCM) as a module that can set time information. Thereafter, the flow advances to step SP28.

At step SP28, the CPU 10 determines whether or not all the clock functional component modules (Clock FCMs) have been checked. When the determined result at step SP28 is "No" (namely, there is a clock functional component module (Clock FCM) that has not been checked), the flow returns to step SP23. At step SP23, the CPU 10 performs the above-described process for a clock functional component module (Clock FCM) that has not been checked.

On the other hand, when the determined result at step SP26 is "No", it represents that the relevant clock functional component module (Clock FCM) does not have the external time setting function or does not permit the external time setting operation. At that point, the CPU 10 determines that the relevant AV device corresponding to the clock functional component module (Clock FCM) does not have the set clock function. Thereafter, the flow advances to step SP28.

When the determined result at step SP28 is "Yes", the flow advances to step SP29. At step SP29, the CPU 10 displays a GUI screen (hereinafter, referred to as time setting menu screen) shown in FIG. 7A for devices that can set time on the LCD 17.

The time setting menu screen P1 displays a list of device selection buttons F1 to F3 that represent devices having the time setting function connected to the same network as the first receiving device 3 (in the example, the digital VCR 6, the DVD player 8, and the digital TV 9). The time setting menu screen P1 also displays a current time field M1, an OK button F4, and a cancel button F5 in succession on the right side thereof.

Figure 7A:
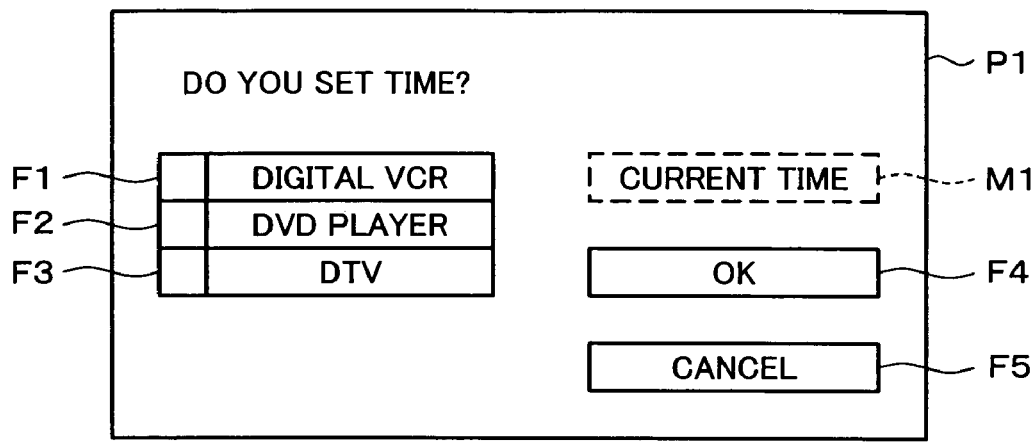
FIGS. 7A and 7B are schematic diagrams showing a time setting menu screen.
Figure 7B:
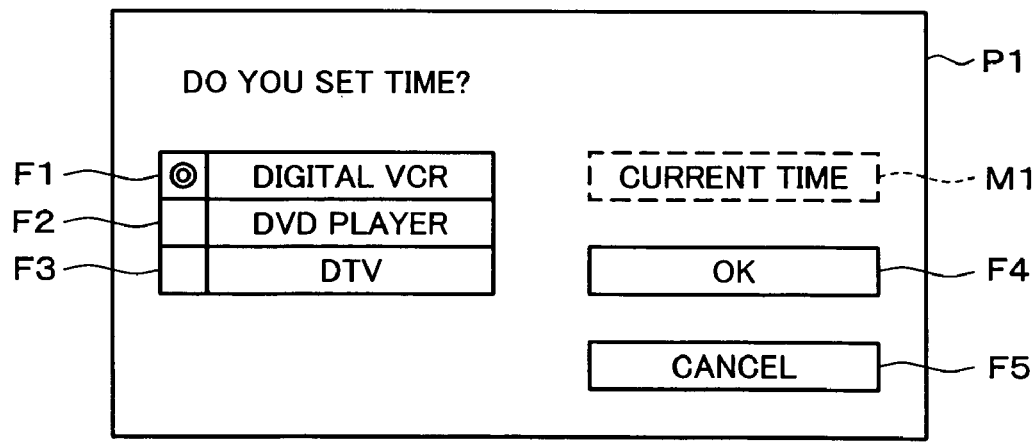

When the user designates a desired device selection button (F1 to F3) on the time setting menu screen P1 (in this example, it is assumed that the user has selected the device selection button F1) at step SP29, as shown in FIG. 7B, a predetermined mark (for example, a concentric circle mark) appears in a check mark field on the left of the device selection button F1 on the time setting menu screen P1.

When the OK button F4 on the time setting menu screen P1 (shown in FIG. 7B) is clicked, the flow advances to step SP30. At step SP30, the CPU 10 determines that the controlled device 6 corresponding to the device selection button F1 checked with the concentric circle mark is a device whose time information should be set. Thereafter, the flow advances to step SP31.

At step SP31, the CPU 10 of the first receiving device 3 obtains time information through for example a digital satellite broadcast. Thereafter, the flow advances to step SP32.

At step SP32, the CPU 10 sends a set clock command (including time information displayed in the current time field M1) to the designated controlled device 6. Thereafter, the flow advances to step SP33. At step SP33, the CPU 10 completes the time setting process RT2.

When the cancel button F5 is clicked in the state shown in FIG. 7B, the checked mark disappears as shown in FIG. 7A. Thereafter, when the OK button F4 or the cancel button F5 is clicked on the time setting menu screen P1 shown in FIG. 7A, the CPU 10 completes the time setting process RT2 in the state that the time setting menu screen P1 appears.

In such a manner, the CPU 10 of the first receiving device 3 as a controlling device recognizes and registers devices that can set time from a number of digital AV devices 4 to 9 connected to the IEEE 1394 bus 2 and outputs the "Set Clock" command as, for example, an AV/C command to a digital AV device designated by the user. As a result, time of the time information can be set to the designated digital AV device.

(4-2) Operation and Effect of the Second Embodiment.

In the above-described structure, the first receiving device 3 as a controlling device of the AV system 1 obtains the ID of a clock functional component module (Clock FCM) of the number of digital AV devices (controlled devices and controlling device) 4 to 9 connected to the IEEE 1394 bus 2 from the registry 34. When the clock functional component module (Clock FCM) corresponding to the obtained ID is locally controlled by the second receiving device 5 rather than the first receiving device 3, it obtains the information representing whether or not the device (4 to 9) has the time compensating function from the second receiving device 5.

The first receiving device 3 sends the "Has Auto Clock" and the "Set Allowable Clock" to the relevant clock functional component module (Clock FCM). Corresponding to the returned value of the relevant clock functional component module (Clock FCM), the first receiving device 3 determines whether or not the clock functional component module (Clock FCM) has the time information setting function and permits the external time information setting operation. Thereafter, the first receiving device 3 sends a clock set command including time information to a digital AV device that has been designated by the user and that has the time information setting function and permits the external time information setting operation. As a result, even if the relevant device is not controlled by the first receiving device 3 or even if the relevant device does not have the time compensating function, time of the time information contained in the command can be set to the relevant device.

In the above-described structure, the first receiving device 3 of the AV system 1 extracts and registers a digital AV device that has the time information setting function from the plurality of digital AV devices (controlled devices and controlling device) connected to the IEEE 1394 bus 2. When the user designates a desired digital AV device from the registered digital AV devices, the first receiving device 3 sets time of the time information obtained from a digital satellite broadcast or the like to the designated digital AV device. Thus, even if the designated digital AV device is not controlled by the first receiving device 3 or the designated digital AV device does not have the time compensating function, a command can be substantially converted between the first receiving device 3 and the designated digital AV device. As a result, time of each device on the network can be uniformly managed.

(5) Further Embodiment

According to the above-described embodiments, it was assumed that the controlling apparatus (namely, a first electronic device) of the present invention is applied to the first receiving device 3 and the second receiving device 5 of the AV system 1. However, it should be noted that the present invention is not limited to such a structure. Instead, the present invention can be applied to various types of controlling apparatuses that control a number of digital AV devices 4 to 9 connected on the network. In the above-described embodiments, it was assumed that the second receiving device 5 has the time compensating function. However, when the second receiving device 5 as a controlling device does not have the time compensating function, it is treated as a device controlled by the first receiving device 3.

According to the above-described embodiments, the present invention was applied to the AV system 1 of which the controlling devices 3 and 5 and the controlled devices 4 and 6 to 9 are connected through the IEEE 1394 bus 2. However, the present invention can be applied to various types of network systems of which a controlling device can control a controlled device or another controlling device.

In the above-described embodiments, the present invention was applied to the HAVi software module 30 as middleware for integrally managing and controlling a plurality of digital AV devices 4 to 9 connected through the IEEE 1394 bus 2. However, the present invention is not limited to such a structure. Indeed, as long as the digital AV devices 4 to 9 are integrally managed and controlled, the present invention can be applied to various types of software modules.

In the above-described embodiments, it was assumed that the controlling apparatus of the present invention is applied to the first receiving device 3 of the AV system 1. Instead, the controlling apparatus of the present invention can be applied to the second receiving device 5. Besides the receiving device (IRD), when the HAVi device class is an FAV (Full AV device) or an IAV (Intermediate AV Device) and when an auto time software element and an external time information obtaining part are provided, various types of devices such as a digital television receiver, an AV selector, and a personal computer can be used as controlling apparatuses. In addition, as controlled devices, besides the digital VCR 6, various types of digital AV devices such as the MD deck 7, the CD player 4, the DVD player 8, and the digital TV 9 can be used.

According to the above-described embodiments, it was assumed that the antenna 19 and the tuner portion 14 of the first receiving device 3 are used as an external time information obtaining part and that the time information is superimposed with a digital satellite broadcast. However, the present invention is not limited to such a structure. In other words, as long as external time information can be obtained, various types of external time information obtaining systems can be used.

According to the above-described embodiments, as a command system for controlling digital AV devices (electronic devices) connected to the IEEE 1394 bus 2, an AV/C digital interface command set was used. Thus, as time information supplied through the network, it was assumed that AV/C commands are used. However, the present invention is not limited to such a structure. Instead, as long as commands can be supplied to electronic devices connected on the network, the present invention can be applied to various types of native commands.

As described above, the present invention is a controlling apparatus for exchanging an information signal among a number of electronic devices through a network system, including a control information obtaining part for obtaining control information from the electronic devices, the control information allowing the electronic devices to be controlled, a time setting function determining part for determining whether or not the electronic devices have a time setting function corresponding to the control information obtained by the control information obtaining part, a time information obtaining part for obtaining time information, and a time information setting part for setting the time information obtained by the time information obtaining part to each of the electronic devices determined as devices having the time setting function by the time setting function determining part. As a result, according to the controlling apparatus, even if an electronic device connected to a network system does not have a function for obtaining time information through the network system, time corresponding to time information can be set to the electronic device.

The present invention is a controlling method for exchanging an information signal among a number of electronic devices through a network system, which includes the steps of (a) obtaining control information from the electronic devices, the control information allowing the electronic devices to be controlled, (b) determining whether or not the electronic devices have a time setting function corresponding to the control information obtained at the step (a), (c) obtaining time information, and (d) setting the time information obtained at the step (c) to each of the electronic devices determined as devices having the time setting function at the step (b). As a result, according to the controlling method, even if an electronic device connected to a network system does not have a function for obtaining time information through the network system, time corresponding to time information can be set to the electronic device.

The present invention is a record medium for storing a program that executes the steps of (a) obtaining control information from the electronic devices, the control information allowing the electronic devices to be controlled, (b) determining whether or not the electronic devices have a time setting function corresponding to the control information obtained at the step (a), (c) obtaining time information, and (d) setting the time information obtained at the step (c) to each of the electronic devices determined as devices having the time setting function at the step (b). As a result, when the program stored in the record medium is executed, even if an electronic device connected to a network system does not have a function for obtaining time information through the network system, time corresponding to time information can be set to the electronic device.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

I claim as my invention:

1. A controlling apparatus for exchanging an information signal among a plurality of electronic devices through a network system, comprising:
   a control information obtaining part for obtaining control information from the plurality of electronic devices, the control information allowing the plurality of electronic devices to be controlled;
   a time setting function determining part for determining whether the plurality of electronic devices have a time setting function corresponding to the control information obtained by the control information obtaining part;
   a time information obtaining part for obtaining time information; and
   a time information setting part for setting each of the electronic devices determined as devices having the time setting function by the time setting function determining part to the time information obtained by the time information obtaining part wherein the time information obtaining part includes a clock accuracy determining part configured to determine an accuracy value of one or more clocks present in the network system, wherein the time information obtaining part obtains the time information from a highest time accuracy clock, wherein the highest time accuracy clock has the best accuracy value of the accuracy values determined by the clock accuracy determining part.

2. A controlling apparatus for exchanging an information signal among a plurality of electronic devices through a network system as claimed in claim 1, wherein the network system is composed of an IEEE 1394 serial bus.

3. A controlling apparatus for exchanging an information signal among a plurality of electronic devices through a network system as claimed in claim 1, wherein the control information obtaining part obtains the control information when a topology of the network changes.

4. A controlling apparatus for exchanging an information signal among a plurality of electronic devices through a network system as claimed in claim 1, wherein the control information obtained by the control information obtaining part is composed of a control program for controlling the electronic devices and device attribute information of the electronic devices.

5. A controlling apparatus for exchanging an information signal among a plurality of electronic devices through a network system as claimed in claim 1, further comprising:
   a time setting permission determining part for determining whether the electronic devices permit an external setting operation of the time information;
   wherein the time information setting part sets the electronic devices whose external setting operation has been permitted by the time setting permission determining part to the time information.

6. A controlling, apparatus for exchanging an information signal among a plurality of electronic devices through a network system as claimed in claim 1, further comprising:
   a time setting displaying part for displaying the electronic devices for which said time information setting part is capable of setting the time information.

7. A controlling apparatus for exchanging an information signal among a plurality of electronic devices through a network system as claimed in claim 6, further comprising:
   a time setting selecting part for selecting an electronic device from the electronic devices displayed as devices that are capable of setting the time information by the time setting displaying part.

8. A controlling apparatus for exchanging an information signal among a plurality of electronic devices through a network system as claimed in claim 1, further comprising;
   a time compensating function determining part for determining whether the electronic devices have a time compensating function corresponding to time information obtained from the outside, the time compensating function allowing the electronic devices to compensate time thereof;
   wherein the time information setting part sets the electronic devices determined as devices that do not have the time compensating function by the time compensating function determining part to the time information obtained by the time information obtaining part.

9. A controlling apparatus for exchanging an information signal among a plurality of electronic devices through a network system as claimed in claim 8, wherein the time information obtaining part obtains the time information from at least one of the electronic devices determined as devices that have the time compensating function by the time compensating function determining part.

* * * * *